Figure 1:
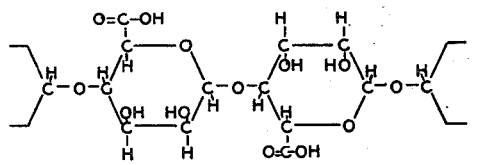

ARNOLD B. STEINER
W. H. McNEELY
INVENTORS

UNITED STATES PATENT OFFICE 2,494,911

HIGH-STABILITY GLYCOL ALGINATES AND THEIR MANUFACTURE

Arnold B. Steiner, La Jolla, and William H. McNeely, San Diego, Calif., assignors to Kelco Company, San Diego, Calif., a corporation of Delaware Application December 22, 1945, Serial No. 636,938

20 Claims. (Cl. 260—209.6)

This invention relates to reactions between alginic acid and the epoxy-paraffins or alkylene oxides by which the properties of the acid are changed in a manner which imparts a new utility to the product.

More specifically, the invention relates to improvements in a heretofore disclosed method of manufacturing glycol alginates by which the properties of the product are materially bettered while the manufacturing cost is reduced.

In a copending application filed April 3, 1944, by Arnold B. Steiner under Serial No. 529,423, now Patent No. 2,426,125, it is disclosed that alginic acid may be reacted directly with the alkylene oxides to form a hitherto unknown series of addition compounds which have been termed "glycol alginates." These compounds differ in properties from alginic acid and the alkali metal alginates in the following respects.

Alginic acid is substantially insoluble in water; its salts with the alkali metals, magnesium, ammonium and many organic bases are freely water-soluble, forming colloidal solutions of high viscosity. The glycol alginates are freely water-soluble and form viscous and colloidal aqueous solutions.

Alginic acid combines readily with basic substances such as the soluble hydroxides and carbonates but reacts slowly if at all with any of the neutral metallic salts; the soluble alginates (limiting that term to the salts described in the paragraph above) form gels or gelatinous precipitates with water-soluble salts of the alkaline-earth metals (except magnesium), and of aluminum and the heavy metals. By contrast, the glycol alginates show much less reactivity with the salts which precipitate the soluble alginates.

Alginic acid is a rather strong acid (pH 1.8 to 2.5 in 1% aqueous dispersion); its water-soluble salts are decomposed with precipitation of the substantially insoluble acid in media below about pH 4. The glycol alginates, when made by the method of the copending application, are strongly acidic, usually pH 3 or even lower. In the method herein disclosed the hydrogen ion concentration may be controlled up to about pH 5. In neither case are solutions of the glycol alginates precipitated or gelatinized by even the strong acids.

The varied utilities of the three products follow from this difference in properties. Alginic acid per se has little usefulness other than as the raw material from which its salts are made. The soluble salts have a high degree of utility in situations in which gelatinization is desired, but where gel formation is to be avoided they cannot be used in any acid medium and can be made compatible with calcium-containing liquids such as milk only by an elaborate formulation with buffers or with precipitants for calcium ions. The glycol alginates may be used freely in acid media and somewhat less freely in milk and may be protected against gelatinization when mixed with liquids richer in calcium by control of the concentration of the alginate and of the pH value of the medium.

The method described in the copending application is very simple. The moist alginic acid is treated, in a subdivided state, with an alkylene oxide at a temperature usually ranging from 60° C. to 77° C. in a closed vessel, the reaction usually being completed in from one to three hours. The product occurs in the fibrous state (unless a large excess of water be present) and in its original degree of comminution. No further preparation is required than to evaporate any excess oxide which it may contain and to bring the water content to a standard.

While the method described in the copending application is fully functional, we have further discovered that some of the properties of the product may be improved, and the quantity of oxide required for the reaction may be reduced, by making use of certain manipulative steps not covered in the copending application, and which are the subject matter of the instant disclosure.

PARTIAL NEUTRALIZATION

The discovery on which the new manipulation is grounded is of the utility of a partial neutralization of the alginic acid prior to the reaction with an alkylene oxide. The application of this step renders it possible to stabilize the product by raising its pH value above the critical level and to reduce the number of free carboxyl groups present in the final product. It also facilitates the production of a fully soluble alginate, reduces the extent to which both the alginic acid and the alkylene oxide are hydrolized during the esterifying reaction, and materially accelerates the reaction between the oxide and the acid.

It would be reasonable to anticipate that the partial neutralization of alginic acid with a basic substance, followed by esterification of the free acid remaining, would produce a mixture of a glycol alginate with a water-soluble alginic salt, and that solutions of such a mixture would be gelatinized by acids. This anticipated result did not occur, the product of esterification of the partially neutralized acid being compatible with acids in all strengths.

Further, while alginic acid is substantially insoluble, the product of partial esterification of the free acid remaining after partial neutralization is fully soluble, even when thirty percent or over of the original acidity remains unsatisfied.

It is believed, therefore, that when a quantity of a base insufficient for complete neutralization is added to the acid it does not completely neutralize a portion of the molecules of acid, leaving the remaining molecules wholly uncombined but, rather, that it distributes itself in such manner as to satisfy a portion only of the carboxyl groups of each molecule. For the same reason it seems probable that the remaining carboxyl groups of each molecule may be completely or partially blocked by esterification, in the manner illustrated in the structural formulae shown in the attached drawing.

Figure 2:
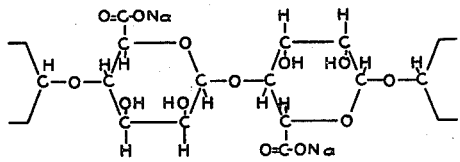
Figure 3:
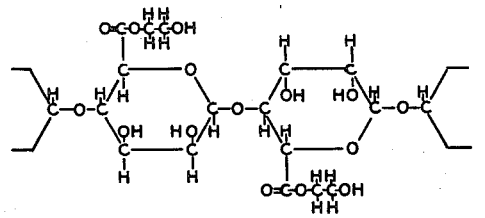
Figure 4:
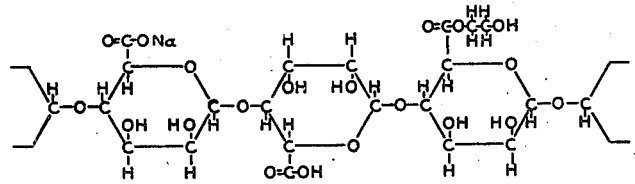

In these diagrams, which offer the most probable explanation of the peculiar behavior of a partially neutralized and partially esterified product: Fig. 1 shows the known structure of alginic acid; Fig. 2 shows the known result of complete neutralization of the carboxyl groups with, for example, sodium; Fig. 3 shows the probable structure of the product resulting from complete esterification with, for example, ethylene oxide, and Fig. 4 illustrates the probable structure of the product resulting from partial neutralization followed by incomplete esterification of the remaining carboxyl groups.

Alginic acid is known to consist in great part of anhydro-D-mannuronic acid residues linked glycosidically in accordance with the formula of Fig. 1. In this structure the mannuronic units are linked in such manner that the carboxyl groups are free to react while the aldehyde groups are shielded by linkages. It will be understood that this and the succeeding diagrams represent only three links in a very long polymeric chain, the molecular weights indicating that a high-viscosity acid may have from one hundred to several hundred mannuronic units in the chain.

The theoretical combining weight of alginic acid is the weight of one mannuronic unit (176) regardless of the number of units in the polymer. The actual combining weight of the commercial acid is nearer 215, indicating the presence of unknown, nontitratable substances. When alginic acid is combined with sodium in the proportion (about) 215:23 the product is a neutral salt, the structure being as in Fig. 2 which shows all the carboxyl groups satisfied by the base.

If it were possible wholly to esterify alginic acid, the structure of the product would be as illustrated in Fig. 3, in which the replaceable hydrogen of each carboxyl has attached to the oxygen of the oxide and through it to one of the carbons while the other carbon links with the terminal oxygen of the carboxyl. The validity of this structure is supported by the observation that alkalis decompose the ester, forming the salt of Fig. 2.

In Fig. 4 the carboxyl of the first unit in the fragmental chain has been satisfied with sodium, that of the second with ethylene oxide while the third carboxyl remains unreacted. In a chain having a hundred or more units each having one carboxyl group, both neutralization and esterification may proceed by very small increments and the resultant product may have any percentage proportion of its carboxyl groups combined with the base, or with the oxide, or free, according to the extent to which each reaction is carried.

Figure 5:
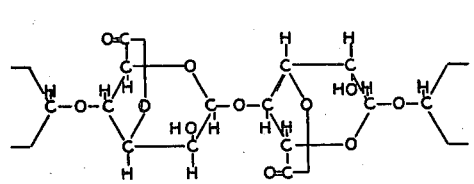
Figure 6:
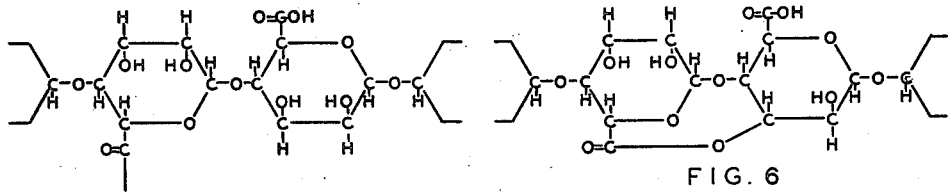
Figure 7:
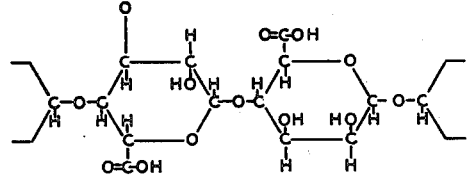

It is recognized also that some of the carboxyl groups of the alginic acid may be esterified with the hydroxy groups of the alginic acid. Thus the reaction may occur (1) Between the carboxyl group and the hydroxyl group of the same anhydro-D-mannuronic residue, as illustrated in Fig. 5;

(2) Between the carboxyl group of one anhydro-D-mannuronic residue and the hydroxyl group of another such residue in the same molecule, as illustrated in Fig. 6;

(3) Between the carboxyl group of an anhydro-D-mannuronic acid residue in one molecule and the hydroxyl group of another such residue in another molecule, as illustrated in Fig. 7.

STABILITY OF PRODUCT

Products made by the method described in the copending application, in which alginic acid is reacted with an alkylene oxide without any modification of the acidity of the acid, proved in some instances to be lacking in stability, tending to change (usually to depreciate) in viscosity during storage in the solid condition.

It was discovered that this instability is due to too great acidity of the product and investigation disclosed that the critical level is in the range pH 3.5 to pH 3.9. At the latter figure no change whatever was observed after three months storage; at pH 3.5 the change taking place in that period was of no importance; at pH 3.0, which is about as high as can be had in the esterification of an unmodified acid (pH 1.8 to pH 2.0), a material change in the viscosity of a solution of given strength often occurred in a shorter time, accompanied by decreasing solubility and, occasionally, by a tendency toward gelatinization of the solution.

The low pH product obtained by esterification of an unmodified acid cannot be brought to a higher pH by the addition of alkalis to the finished product, by reason of the splitting of the ester on contact with the base.

This difficulty is avoided by neutralizing, in advance of the alkylene oxide reaction, a small proportion, usually from 5% to 20% but sometimes up to 30%, of the carboxyl groups of the alginic acid to be reacted. It was anticipated that this step might interfere with the esterifying reaction, but on the contrary the undesired hydrolysis of the oxide to the corresponding glycol was strongly restrained, the desired glycol alginate reaction was accelerated, and the consumption of alkylene oxide was materially reduced.

SELECTION OF A BASE

The base used to effect this partial neutralization may be any base producing a water-soluble salt with alginic acid, to wit: ammonia or the lower amines or any of the basic compounds of the alkali metals or of magnesium. As the acid is a water-insoluble compound, ammonia or the volatile amines are preferred as being the most readily dispersed. In instances where the presence of an ammonium salt in the finished product may be objectionable, sodium, potassium or the more costly alkali metals are equally effective.

The preferred base may be used in the form of the hydroxide, the carbonate or a phosphate. The substantial equivalence of three of these bases, which may be considered as typifying hydroxides, carbonates and phosphates, is indicated in the following comparison in which samples of the same batch of alginic acid were partially neutralized with different bases and then esterified with equal ratios of alkylene oxide to acid under identical conditions.

*Table 1*

| Base Used | Percent Carboxyl Groups | | | Product pH [1] |
|---|---|---|---|---|
| | Neutralized | Esterified | Total | |
| Aqueous Ammonia | 12.5 | 80 | 92.5 | 3.8 |
| Anhydrous Ammonia | 15.0 | 82 | 97.0 | 4.5 |
| Sod. Carbonate | 15.0 | 80 | 95.0 | 4.1 |
| Trisod. Phosph | 15.0 | 84 | 99.0 | 5.2 |

[1] pH in 1% solution.

METHODS OF NEUTRALIZING

The method of application of the neutralizing agent should be such as to approach the ideal condition in which a part of the carboxyl groups of each polymeric chain of the acid are combined, rather than all the carboxyls of part of the acid. Because of the substantial insolubility of the acid and the necessity for treating it with the base while in solid form, the tendency is for the basic substance to act only on the outer surfaces of the acid particles, producing a condition which is unfavorable to the subsequent esterification reaction.

To overcome this tendency so far as may be we first bring the acid to the physical condition in which it is most amenable to reaction with the base. This involves reduction of the water content of the acid which, as it comes from the manufacturing process is of the order of 80% or more, to approximately 50% by weight. A desirable way of producing this reduction is by repeated passage of the acid through a hammer mill supplied with a current of warm, dry air but any method of drying by gentle heating, evacuation or extraction with alcohols may be used. A water content ranging from 45% to 55%, while not critical, has been found to give the best reaction rate for the esterification with the least hydrolysis of the alkylene oxide. The reduced water content strongly facilitates subdivision, the product of this combined drying and shredding step being a fluffy mass of fine, thread-like fibres which expose a very large surface area per unit of mass.

Partial neutralization with ammonia may be produced either during or after the completion of the drying step. In the first alternative, gaseous ammonia is introduced into the air current used for drying. In the second, the fluffed and dried acid is placed in an autoclave, which may desirably be flushed out with gaseous ammonia to remove air. The ammonia, in aqueous solution or in gaseous form, is then introduced and the mass stirred for perhaps an hour, preferably under superatmospheric pressure and at a temperature above atmospheric, as for example 35° cent.

For neutralization with a carbonate of an alkali metal or of ammonia a somewhat different procedure is advisable. The acid is first roughly subdivided by three or four passes through the hammer mill, without drying. A small amount of a wetting agent, as for example a 10% solution of the dioctyl ester of sodium sulfosuccinic acid, known commercially as "Aerosol OT," is then added and followed by a milky slurry of a dilute aqueous solution of the carbonate dispersed in an equal volume of a low boiling-point alcohol or ketone. After an additional few minutes of stirring the mixture of acid and base is withdrawn from the mixing vessel and dried and fluffed as above described, by repeated passes through a hammer mill. The greater part of the subdivision of the acid particles occurs after the addition of the base and thus the base is thoroughly disseminated through and reacted with the acid during the drying and comminuting step.

For neutralizing with an alkali metal phosphate such as trisodium phosphate, it is preferable to add to the undried acid about one-half its weight of an alcohol such as isopropanol. The mixture is stirred for a few minutes, after which the suspension of the finely ground phosphate in a further small quantity af alcohol is added, the mixture being stirred for some time to cause the particles of the salt to become attached to the acid fibres. The liquid is then drained off and the mass pressed to expel as much liquid as possible, after which it is fluffed as above described. The water content is adjusted during this step, by heating or by addition of water.

The alkali metal phosphate can also be added in the form of an aqueous solution or of a powder to the alginic acid during the fluffing step prior to drying or to the acid which has been dried to about 50% solids.

EFFECTS OF PARTIAL NEUTRALIZATION

The effectiveness of the above described step of partial neutralization in increasing esterification and in raising the pH value of the product is illustrated in the following comparison. To obtain these figures identical samples of alginic acid were treated with ammonia to various degrees of partial neutralization and were then reacted with equal quantities of an alkylene oxide under identical conditions.

*Table 2*

| Base Used | Percent Carboxyl Groups | | | Product pH [1] |
|---|---|---|---|---|
| | Neutralized | Esterified | Total | |
| None | 0.0 | 70 | 70.0 | 3.0 |
| Ammonia | 5.0 | 67 | 72.0 | 3.1 |
| Do | 10.0 | 76 | 86.0 | 3.5 |
| Do | 12.5 | 80 | 92.5 | 3.8 |
| Do | 15.0 | 82 | 97.0 | 4.5 |
| Do | 30.0 | 69 | 99.0 | 4.7 |

[1] pH in 1% aqueous solution.

EFFECTS OF TEMPERATURE VARIATIONS

The differences in result produced when an unmodified acid is treated with an alkylene oxide for equal periods at different temperatures is illustrated in the following table. In these treatments the method was identical in each case except as noted in the table.

Table 3

| Time and Temperature | Percent Carboxyl Groups | | | Product pH—1% | Solubility of Product |
|---|---|---|---|---|---|
| | Neutralized | Esterified | Total | | |
| 4 hours 35° C | 0 | 46 | 46 | 2.8 | Incomplete. |
| 2 hr/35° 2/50° | 0 | 55 | 55 | 2.8 | Almost Cp. |
| 4 hours 50° C | 0 | 70 | 70 | 2.9 | Complete. |
| 4 hours 70° C | 0 | 51 | 51 | 2.9 | Incomplete. |
| 4 hours 70° C | 10 | 79 | 89 | 3.6 | Do. |

These and other experiments indicate that at a temperature as low as 35° C. the reaction between acid and oxide proceeds so slowly that the oxide is incompletely utilized, an excessive proportion being lost through hydrolysis. The result is that a portion of the acid is not rendered soluble by conversion to the alginate. The ratio of oxide to acid in these experiments was such as to produce a fully satisfactory product under more favorable conditions, as evidenced by the result of the treatment at 50°. At this temperature the reaction between oxide and acid is much accelerated and a soluble product is obtained. At 70° hydrolysis of the oxide is so rapid that it is consumed before the glycol alginate reaction can complete itself, unless restrained by partial neutralization. Comparison of the results shown in the last two lines of the table illustrates this restraining effect on hydrolysis and the accompanying increase in esterification. At this temperature, however, an incompletely soluble product is formed, even from the modified acid, perhaps due to a secondary reaction of the glycol alginate with ammonium salts.

The optimum temperature for esterification is thus very definitely above 35° C. and below 70°, and the indications are that it lies within the range from 45° to 60° C., varying somewhat with other conditions.

EFFECTS OF VARYING TREATING TIME

The effects of time variations are shown in the following table, reciting the results obtained in treating samples of alginic acid with an alkylene oxide under conditions which were identical except as to percentage neutralization:

Table 4

| Hours of Contact | Percent Carboxyl Groups | | | Product pH—1% | Maximum Temp. |
|---|---|---|---|---|---|
| | Neutralized | Esterified | Total | | |
| | | | | | Degrees |
| 4 | 10 | 73 | 83 | 3.4 | 50 |
| 5.5 | 15 | 74 | 89 | 3.6 | 55 |
| 8 | 15 | 79 | 94 | 3.9 | 50 |
| 22 | 15 | 82 | 97 | 4.5 | 50 |

These and other experiments indicate that a reaction time of about eight hours is sufficient for the substantially complete utilization of the alkylene oxide at 50° C. In the twenty-two hour treatment the batch was maintained at a low temperature, 35° C. or less, for all but about two hours of the treating time.

EFFECTS OF VARIATION IN OXIDE : ACID RATIO

A soluble product, though not of the best quality, may be made under favoring conditions with the use of as little as one mol alkylene oxide to one mol of a modified acid. The effects which follow from increase in the ratio of oxide to acid are exhibited in the following table:

Table 5

| Molar Ratio, Oxide:Acid | Percent Carboxyl Groups | | | Hours | Product pH—1% | Appearance of Solution |
|---|---|---|---|---|---|---|
| | Neutralized | Esterified | Total | | | |
| 1:1 | 20 | 39 | 59 | 7 | 3.2 | Hazy. |
| 1:1 | 20 | 45 | 65 | 22 | 3.3 | Short. |
| 1.5:1 | 20 | 57 | 77 | 7 | 3.4 | Bright. |
| 1.5:1 | 20 | 61 | 81 | 22 | 3.6 | Do. |
| 2:1 | 20 | 66 | 86 | 7 | 3.6 | Do. |
| 2.25:1 | 10 | 76 | 86 | 22 | 3.5 | Short. |
| 3:1 | 15 | 83 | 98 | 7 | 4.3 | Bright. |
| 3:1 | 15 | 82 | 97 | 22 | 4.3 | Do. |

The term "short" as used in the above table signifies that a solution of 1% weight concentration showed a very slight tendency toward gelatinization and poured in blobs, whereas the "bright" and "hazy" solutions would draw into a long string and behave as extremely viscous liquids.

The conditions obtaining in the above experiments were all favorable and the indications are that to realize complete solubility and a satisfactory degree of stability it is desirable to use not less than 1.5 mols of the alkylene oxide to one mol of a partially neutralized acid, and that to obtain substantially complete esterification of the carboxyl groups left free after partial neutralization it is desirable to increase this ratio to about 3:1. However, a result useful for many purposes is had with a molar ratio as low as 1:1 where a partially neutralized acid is used.

ACID COMPATIBILITY

It was anticipated that partial neutralization, with the consequent production of a water-soluble salt of alginic acid which would pass unchanged into the glycol alginate product, would render the product incompatible with acids. This did not prove to be the case. All the products of the above described process, even such as had up to 30% of their carboxyl groups combined with a base, were completely compatible with acids, giving no precipitate and showing no tendency to gel when strongly acidified.

CALCIUM REACTIVITY

No means has yet been found for preparing a glycol aginate which is completely immune to gelatinization when its concentrated aqueous solutions are mixed with strong solutions of salts of the alkaline-earth or of the heavy metals. Practical difficulties in the use of the material arising from calcium reactivity may, however, be avoided by sufficiently lowering the pH value of the medium in which it is used, or by reducing the concentration of alginate in the medium.

For example, when a solution of 1.25% weight concentration and at a pH value of 4.5 is mixed with a 10% solution of calcium chloride, a hard gel is formed; at 0.6% concentration and the same pH the gel is soft; at 0.4% concentration there is a trace of gel formation, which disappears at 0.3% concentration. At pH 3.5 the concentration tolerance is materially increased, being about 0.6% to avoid any gelatinization; at pH 2.5 the concentration may be about 1.0%, and at pH 1.2 there is substantially no calcium reactivity at any concentration. These figures refer to a grade of glycol aginate which yields an extremely viscous solution at 1% concentration. With alginates giving less viscous solutions (at any given concentration) the tolerance is increased, i. e., the solution may be stronger or the pH higher without incurring calcium reactivity.

As the lowering of pH does not produce acid gelatinization, the extent to which the pH value may be lowered and the concentration tolerance increased thereby is limited only by the nature of the medium in which the glycol alginate is used. As the lowering of pH for this purpose occurs only at the time of use, it has no effect on stability which, as said, requires a relatively high pH in the product itself if it is to be stored.

Thixotropy

Some samples of alkylene glycol alginates have been found to yield thixotropic solutions, which may be objectionable under some circumstances. We have discovered that this property results from the retention of calcium in some commercial alginic acids.

In the use of such raw material, thixotropy may be avoided by reducing the calcium content of the acid to not exceeding 1.5% expressed as CaO. If the acid originates in a process in which a solution of a water-soluble alginate is precipitated as the calcium salt, from which the acid is regenerated by acidification with hydrochloric acid, all that is required is a renewed slight acidification followed by careful water-washing. A low calcium content or calcium-free acid may also be prepared by precipitating sodium alginate from the filtered digestion liquor by the addition of alcohol, followed by dissolving the sodium alginate in fresh water and decomposing it with hydrochloric acid. The glycol alginates prepared from these low-calcium acids show no evidences of thixotropy, even after long standing in solution.

We claim as our invention:

1. In the treatment of alginic acid to produce an alkylene glycol alginate, the steps comprising: partially neutralizing the acidity of said acid with a base of which the alginic salt is water-soluble, and treating the resultant product with an alkylene oxide.

2. In the treatment of alginic acid to produce an alkylene glycol alginate, the steps comprising: combining a minor proportion of the carboxyl groups of said acid with a base of which the alginic salt is water-soluble, and esterifying at least a portion of the uncombined carboxyl groups with an alkylene oxide.

3. In the treatment of alginic acid to produce an alkylene glycol alginate, the steps comprising: combining from five percent to twenty percent of the carboxyl groups of said acid with a base of which the alginic salt is water-soluble, and esterifying at least a portion of the remaining carboxyl groups with an alkylene oxide.

4. In the treatment of alginic acid to produce an alkylene glycol alginate, the steps comprising: combining from five percent to thirty percent of the carboxyl groups of said acid with a base of which the alginic salt is water-soluble, and esterifying at least a portion of the remaining carboxyl groups with an alkylene oxide.

5. In the treatment of alginic acid to produce an alkylene glycol alginate: the steps of treating said acid with a base which yields water-soluble salts with alginic acid, the quantity of said base being such as to combine with only a minor proportion of the carboxyl groups of said acid, and of treating the resultant product with an alkylene oxide under conditions favorable to esterification.

6. In the treatment of alginic acid to produce an alkylene glycol alginate: the steps of treating said acid with a base of which the alginic salt is water-soluble, the quantity of said base being such as to combine with from five percent to thirty percent of the carboxyl groups of said acid, and of treating the resultant product with an alkylene oxide.

7. In the treatment of alginic acid to produce an alkylene glycol alginate: the steps of treating said acid with ammonia in quantity sufficient to combine with from five percent to thirty percent of the carboxyl groups of said acid, and of treating the resultant product with an alkylene oxide.

8. In the treatment of alginic acid to produce an alkylene glycol alginate: the steps of treating said acid with gaseous ammonia under pressure and continuing said treatment until from five percent to thirty percent of the carboxyl groups of said acid have entered into combination with said ammonia, and of treating the resultant product with an alkylene oxide.

9. In the treatment of alginic acid to produce an alkylene glycol alginate, the steps comprising: blending with said acid while in a highly hydrated and roughly comminuted condition a dispersion in a volatile hydrophilic solvent of an alkaline substance of which the alginate is water-soluble; removing any excess of liquid from the mixture; comminuting the moist acid while in suspension in a gaseous stream, thereby driving off any remaining solvent and reducing the water content of said acid within the range 45% to 55% by weight, and treating the resultant product with an alkylene oxide.

10. In the treatment of alginic acid to produce an alkylene glycol alginate, the steps comprising: adjusting the water content of said acid within the range 45% to 55% by weight; finely subdividing said acid; neutralizing from five percent to thirty percent of the carboxyl groups of said acid by combination with a base of which the alginate is water-soluble, and treating the resultant product with an alkylene oxide under conditions favorable to esterification.

11. In the treatment of alginic acid to produce an alkylene glycol alginate free from tendency toward thixotropy, the steps comprising: preparing an alginic acid containing not to exceed 1.5% by weight of calcium as CaO; adjusting the water content of said acid within the range 45% to 55% by weight; finely subdividing said acid;

neutralizing from five percent to thirty percent of the carboxyl groups of said acid by combination with a base of which the alginate is water-soluble, and treating the resultant product with an alkylene oxide.

12. In the preparation of stable alkylene glycol alginates, the steps comprising: combining a portion of the carboxyl groups of alginic acid with a base of which the alginate is water-soluble; controlling the proportion of said base to bring the hydrogen ion concentration of the final product to not less than 3.5 pH; treating the partially neutralized acid with an alkylene oxide at a temperature within the range 45° to 60° cent., and continuing said treatment until not substantially more then twenty percent of the carboxyl groups of said acid remain uncombined.

13. In the preparation of stable alkylene glycol alginates, the steps comprising: combining a portion of the carboxyl groups of alginic acid with a base of which the alginate is water-soluble; controlling the proportion of said base to bring the hydrogen ion concentration of the final product to not less than pH 3.5; treating the partially neutralized acid with an alkylene oxide under superatmospheric temperature and pressure, and continuing said treatment until not substantially more than twenty percent of the carboxyl groups of said acid remain uncombined.

14. In the preparation of an alkylene glycol alginate, the steps comprising: subjecting moist alginic acid to a step of comminution and partial drying while in suspension in a gaseous stream; introducing ammonia into said gaseous stream to combine with a portion of the carboxyl groups of said acid; continuing the aforesaid steps until from five percent to thirty percent of said carboxyl groups have entered into combination with said ammonia, and treating the resultant product with an alkylene oxide under conditions favorable to esterification.

15. A modified, fully water-soluble, solid glycol alginate in which from five percent to thirty percent of the carboxyl groups of alginic acid are combined with a base, in which a part not to exceed twenty percent of the carboxyl groups are unreacted, and in which the remainder of the carboxyl groups are esterified with an alkylene oxide, said glycol alginate being further characterized by a hydrogen ion concentration in 1% aqueous solution not substantially below pH 3.5, and yielding clear, viscous colloidal aqueous solutions.

16. A modified, fully water-soluble, solid glycol alginate in which from five percent to twenty percent of the carboxyl groups of alginic acid are combined with a base of which the alginate is water-soluble, in which a part not to exceed twenty percent of the carboxyl groups are unreacted, and in which the remainder of the carboxyl groups are in combination with an alkylene oxide as an alkylene glycol ester, said glycol alginate being further characterized by a hydrogen ion concentration in 1% aqueous solution not substantially below pH 3.5, and yielding clear, viscous colloidal aqueous solutions.

17. The composition of claim 16 wherein the base is ammonia.

18. The composition of claim 16 wherein the base is an alkali metal.

19. The composition of claim 16 wherein the base is sodium.

20. The composition of claim 16 wherein the base is magnesium.

ARNOLD B. STEINER.
WILLIAM H. McNEELY.

REFERENCES CITED

The following references are of record in the file of this patent:

UNITED STATES PATENTS

| Number | Name | Date |
|---|---|---|
| 1,814,986 | Walsh | July 14, 1931 |
| 2,158,486 | Preble | May 16, 1939 |
| 2,426,125 | Steiner | Aug. 19, 1947 |

FOREIGN PATENTS

| Number | Country | Date |
|---|---|---|
| 417,556 | Great Britain | Oct. 8, 1934 |

OTHER REFERENCES

Malvezin: Chem. Zentr., 1944, vol. I, pp. 757–758, 2 pages.

Chem. Abs., vol. 39 (1945), pp. 3258–3259, 2 pages.